UNITED STATES PATENT OFFICE.

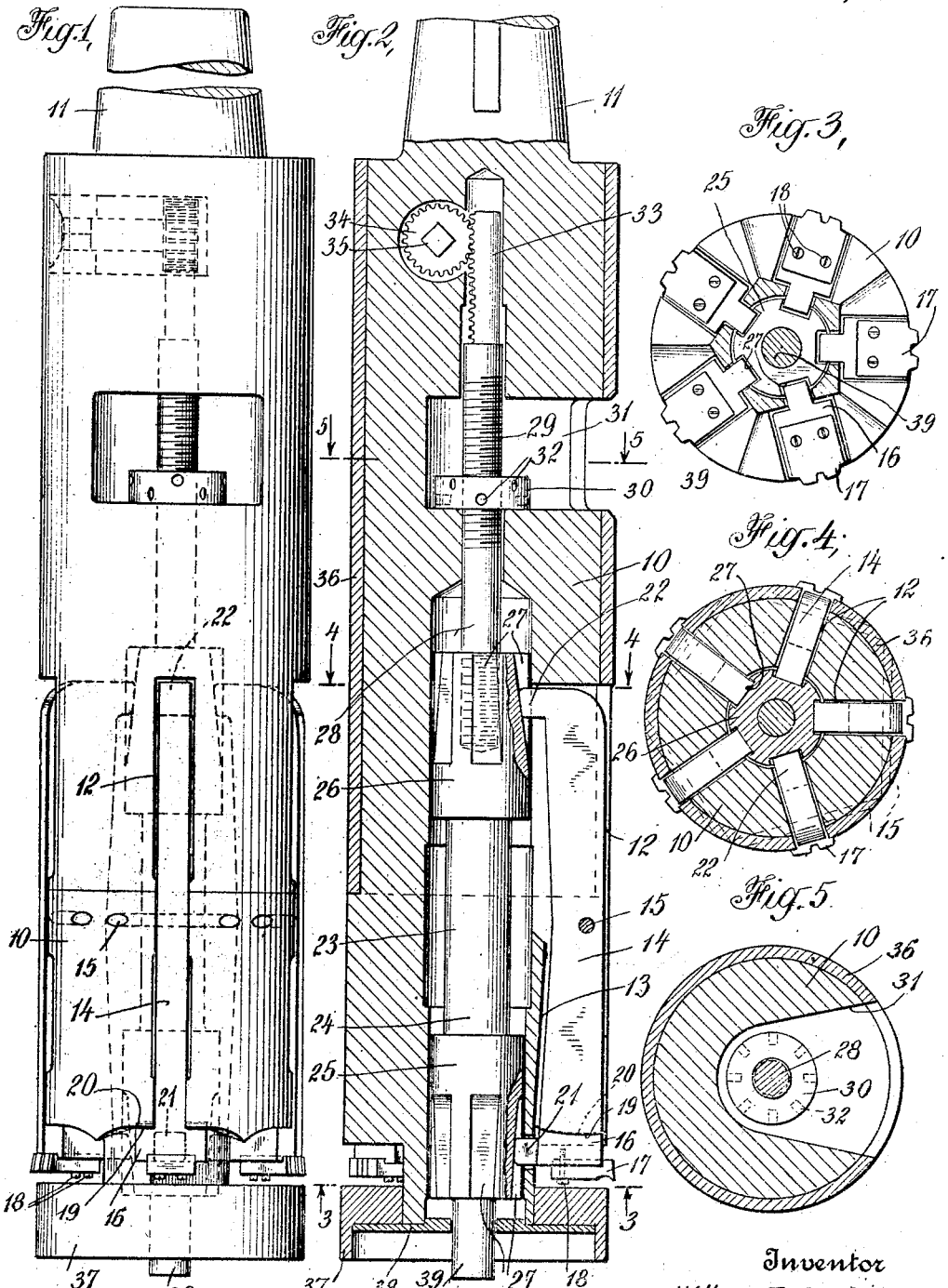

WILLIAM PORTER SPADE, OF WATERVLIET, NEW YORK, ASSIGNOR TO WATERVLIET TOOL COMPANY, INC., OF ALBANY, NEW YORK, A CORPORATION OF NEW YORK.

APPARATUS FOR RIFLING GUN-BARRELS.

1,382,939.   Specification of Letters Patent.   Patented June 28, 1921.

Application filed September 9, 1918. Serial No. 253,148.

*To all whom it may concern:*

Be it known that I, WILLIAM P. SPADE, residing at Watervliet, New York, in the county of Albany, State of New York, have invented certain new and useful Improvements in Apparatus for Rifling Gun-Barrels; and I do hereby declare the following to be a full, clear, and exact description of the invention, such as will enable others skilled in the art to which it appertains to make and use the same.

The present invention which relates to apparatus for rifling gun barrels has for an object the production of a mechanism of simple construction by which the operation of rifling gun barrels may be performed more efficiently, more accurately and in considerably less time than with the usual types of apparatus at present in use for this purpose.

This general object of the invention is attained by a construction which provides for the use of a number of cutting tools which are supported in such a manner as to permit their accurate adjustment to produce a fine graduation of feed for successive cutting operations. The cutting tools are of such number and so disposed with respect to the supporting members of the apparatus as to effectively counteract the working pressures, thereby reducing the thrust on the finished sections of the bore of the gun, while at the same time prolonging the life of the rifling device. The members upon which the cutting tools are supported receive the cutting strains directly back of and at each side of the cutting tools, thereby increasing the strength of the apparatus and enabling the removal of more metal during each passage of the cutting tools through the gun than is possible in apparatus at present in use.

The particular nature of the invention, as well as other advantages thereof, will appear more clearly from a description of a preferred embodiment, as shown in the accompanying drawings, in which Figure 1 is an external view of the entire apparatus; Fig. 2 is a central longitudinal section; Fig. 3 is a transverse section along the line 3—3 of Fig. 2; Fig. 4 is a transverse section along the line 4—4 of Fig. 2; and Fig. 5 is a transverse section along the line 5—5 of Fig. 2.

In the drawings, in which similar reference characters denote similar parts throughout the several views, 10 is a cylindrical body upon which the parts of the apparatus are mounted and which is preferably constructed of steel. The rear end of the body 10 is provided with the usual tapering shank 11 by which the apparatus may be connected to the spindle of a lathe, or other machine with which it is to be used. The body is provided with a longitudinal bore having different diameters according to the elements of the apparatus which are mounted therein.

Formed in the body 10 are longitudinal radial slots 12, of which five are shown in the present embodiment of the invention. The bottom of each of these slots is formed for about one-half of its length by a part of the body as indicated at 13, but the remainder of the slot communicates with the bore within the body of the apparatus. Each slot is adapted to receive a cutter bar 14 which is mounted at its center upon a pin 15 extending from side to side of the slot. The forward end of each cutter bar is provided with a transversely extending head portion 16, to which a suitable cutting tool 17 may be attached by bolts 18, or in any other convenient manner. As shown most clearly in Fig. 1, the heads of the cutter bars extend beyond the sides of the slots within which the bars are mounted, thus forming faces 19 which lie closely adjacent the corresponding faces 20 of the body 10. In order to allow for the swinging of the cutter bars about their pivots 15, these adjacent faces should be given a curvature corresponding to that of a circle having the pivot pin 15 as a center, as shown most clearly in Fig. 2.

Each cutter bar is formed at its front end with an inwardly extending lug 21 which passes through an aperture in the wall 13. The rear part of each cutter bar is also provided with a similar lug 22. Both of the lugs of each cutter bar are adapted to engage a cone bar 23 slidably mounted within the bore of the body 10. This cone bar is formed with a central portion 24 having a diameter somewhat less than the diameter of the bore within which it is placed, and enlarged heads 25 and 26 having a tighter fit within the bore. Each of the enlarged heads of the cone bar is provided with inclined slots 27 corresponding in number to the number of cutter bars. The slots in the head 25 are of increasing depth toward the front end of the head, while the slots in the head 26 are of increasing depth toward the rear of this head. The slots in the heads cooperate with the lugs 21 and 22 of the corresponding cutter bar, the arrangement being such that as the cone bar 23 is moved one way or the other within the body 10, the cutter bars will be swung about their pivots 15 in one direction or the other, on account of the varying depth of the slots in the heads of the cone bar.

For the purpose of moving the cone bar within the body of the apparatus, a spindle 28 is attached to the rear end of the head 26, as by being screwed into the latter. The spindle 28 is provided with screw threads 29 over a portion of its length, and on this threaded portion is a nut 30 placed within a recess 31 formed in the body of the apparatus. The nut 30 may be provided with apertures 32 within which a spanner wrench may be inserted to manipulate the nut. The rear end of the spindle 28 is formed as a rack bar 33 which is adapted to be engaged by a pinion 34 mounted on a shaft 35 supported in the body of the apparatus. The shaft 35 is provided with a square end lying within a recess in the body of the apparatus, and adapted to be engaged by a suitable key by which it may be rotated.

The body 10 is surrounded over a portion of its length by a jacket 36 preferably of bronze, and at its forward end it carries a cup-shaped head 37 also preferably of bronze, adapted to receive a chip protector 38, the latter being provided with a central aperture through which passes a projection 39 extending from the forward end of the head 25.

The rifling apparatus described above is adapted to be mounted upon the end of a lathe spindle and operated in the usual manner, it being understood that suitable cutting tools 17 are attached to the front ends of the cutter bars. The amount of metal that will be taken off during each passage of the apparatus through the bore of a gun, will depend upon the setting of the cutting tools, and this setting may be determined with a high degree of accuracy by moving the cone bar within the bore of the apparatus. On account of the gradual inclination of the slots in the heads of the cone bar and the cooperating lugs at the ends of the cutter bars, the latter may be moved any desired amount to determine the depth of cut that will be made by the cutting tools. The cutter bars will be moved outwardly for each successive passage through the bore of the cone. The amount of such movement may be accurately determined by rotating the nut 30 on the spindle to carry it away from the adjoining face of the slot in which it is placed, and then advancing the spindle by means of the rack and pinion until the nut is brought again in contact with the face of the slot to lock or arrest further advance of the spindle and the cone bar. Since both of the lugs 21 and 22 of the cutter bars at all times engage the corresponding slots in the heads of the cone bar, there will be no possibility of movement of the cutter bars after they have once been set in any desired position of adjustment.

While in the present embodiment of the invention, five cutter bars adapted to hold the corresponding number of cutting tools have been shown, it will be understood that by suitable modification of the apparatus, any other number of cutter bars and tools may be employed according to the number of riflings which it is desired to cut into the gun barrel. On account of the symmetrical arrangement of the cutting tools, and the fact that the cutting strains are taken up principally between the faces 19 and 20 of the heads of the cutter bars and the body of the apparatus, the working pressures will be properly taken care of, and thrusts on the finished sections of the gun bore will be considerably reduced, thus prolonging the life of the jacket of the apparatus, and at the same time enabling the removal of considerably more metal during each passage of the rifling device through the bore of the gun than is possible in existing devices. By supporting the cutter bars at their centers and operating them by means of the cone bar with tapered slots, a fine adjustment of the cutting tools may be secured, thereby enhancing the accuracy obtainable by the apparatus. On account of the inherent rigidity of the construction, the apparatus may perform considerably more work before it is necessary to resharpen the cutting tools than is possible in other known types of devices in which the necessity for frequent sharpening of the tools lessens their efficiency and increases their cost of operation. The construction has the further advantage that no deteriorating effect is imparted to the delicate finish of the bore of a gun during the rifling operation.

While one embodiment of the invention has been illustrated and described, it will be understood that various changes in the details of construction of the apparatus may be made without departing from the principle of the invention as defined in the appended claims.

I claim:

1. In an apparatus for rifling gun barrels, the combination of a body member, a cutter bar pivoted intermediate its ends, carried by the body member, a member for controlling the cutter bar movable longitudinally of the body member and engageable with both ends of the cutter bar, means for moving the member that controls the cutter bar, and a cutter carried on one end of the cutter bar.

2. In apparatus for rifling gun barrels, the combination of a body member, a cutter bar pivoted intermediate its ends on the body member, a cutter bar controlling member engageable with both ends of the cutter bar and movable longitudinally of the body member to effect adjustment of the cutter bar, a nut threaded on the cutter bar controlling member and engageable with the body member, for regulating the longitudinal movement of the cutter bar controlling member, and means for moving the cutter bar controlling member longitudinally of the body member.

3. In apparatus for rifling gun barrels, the combination of a cylindrical body member provided with slots and a central axial bore, swinging members mounted within the slots, cutting tools mounted upon the members, and means movable through the bore of the body member and engaging both ends of each swinging member, whereby the angular relation of the swinging members to the body member may be changed to set the cutting tools.

4. In apparatus for rifling gun barrels, the combination of a body member provided with longitudinal slots and a central longitudinal bore, members pivotally mounted within the slots, cutting tools detachably mounted on the forward ends of the said members, and means within the bore of the body member and operatively related to both ends of the members for adjusting the angular position of the latter with respect to the body member to set the cutting tools.

5. In apparatus for rifling gun barrels, the combination of a body member provided with longitudinal slots and a longitudinal central bore, swinging cutter bars mounted in said slots, cutting tools detachably mounted on the forward ends of the cutter bars, a member slidably mounted within the bore in the body member and provided with inclined surfaces coöperating with opposite ends of the cutter bars for swinging the latter, and means for adjusting the position of the slidable member to adjust the setting of the cutting tools.

6. In apparatus for rifling gun barrels, the combination of a body member provided with longitudinal slots and a longitudinal central bore, swinging cutter bars mounted in said slots and formed with inwardly directed ends, cutting tools detachably mounted on the forward ends of the cutter bars, a member slidably mounted within the bore in said body member and formed with enlarged ends provided with oppositely directed inclined slots adapted to receive the inwardly directed ends of the cutter bars, and means for moving the slidable member within the bore of the body member to swing the cutter bars and thereby adjust the position of the cutting tools.

7. In apparatus for rifling gun barrels, the combination of a body member provided with longitudinal slots and a central bore, cutter bars pivotally mounted within the slots and provided at their forward ends with transverse heads adapted to engage the front end of the body member adjacent the said slots to receive the thrust produced by the cutting operation, cutting tools detachably mounted on the front face of the said transverse heads, and means within the bore of the body member and coöperating with the cutter bars for adjusting the position of the latter to set the cutting tools.

8. In apparatus for rifling gun barrels, the combination of a body member provided with slots and a central bore, members pivotally mounted within the slots, cutting tools mounted on the forward ends of the said pivotally mounted members, a slidable member within the bore of the body member and adapted to coöperate with the pivotally mounted members for adjusting the position of the latter, a spindle within the bore of the body member and connected to said slidable member, said spindle being provided with a rack bar, a pinion mounted within the body member and engaging the rack bar for moving the slidable member, and a nut screwed upon the spindle and placed within a recess in the body member, by which the advance of the spindle and the slidable member may be determined.

9. In apparatus for rifling gun barrels, the combination of a body member, members pivotally attached to said body member, cutting tools mounted upon said pivotally mounted members, means within said body member and coöperating with said pivotally mounted members for adjusting the position of the latter, a sleeve surrounding the body member over a portion of its length, a cup-shaped member attached to the forward end of the body member immediately in front of the cutting tools, and a chip protector mounted within the cup-shaped member.

In testimony whereof I affix my signature.

WILLIAM PORTER SPADE.